(12) United States Patent
McKenzie

(10) Patent No.: US 8,997,510 B2
(45) Date of Patent: Apr. 7, 2015

(54) SOLAR POWERED COMPRESSOR/PUMP COMBINATION

(76) Inventor: Craig McKenzie, Los Angeles, CA (US)

(*) Notice: Subject to any disclaimer, the term of this patent is extended or adjusted under 35 U.S.C. 154(b) by 763 days.

(21) Appl. No.: 12/721,184

(22) Filed: Mar. 10, 2010

(65) Prior Publication Data

US 2011/0219801 A1 Sep. 15, 2011

(51) Int. Cl.
*F25B 27/00* (2006.01)

(52) U.S. Cl.
CPC ......... *F25B 27/005* (2013.01); *F25B 2400/075* (2013.01); *Y02B 10/20* (2013.01); *Y02B 10/24* (2013.01)

(58) Field of Classification Search
CPC .. F25B 27/00; F25B 2400/075; F25B 27/005; Y02B 10/24; Y02B 10/20
USPC .......... 62/235.1, 236, 238.4, 238.6, 264, 498; 417/350
See application file for complete search history.

(56) References Cited

U.S. PATENT DOCUMENTS

| | | | |
|---|---|---|---|
| 1,683,266 A | | 9/1928 | Shipman |
| 3,991,741 A | | 11/1976 | Northrup, Jr. et al. |
| 3,996,759 A | | 12/1976 | Meckler |
| 4,069,812 A | | 1/1978 | O'Neill |
| 4,116,221 A | * | 9/1978 | Zaugg et al. ............. 126/605 |
| 4,246,885 A | * | 1/1981 | Austin .................... 126/584 |
| 4,249,516 A | * | 2/1981 | Stark ..................... 126/601 |
| 4,304,103 A | * | 12/1981 | Hamrick et al. ........... 62/228.1 |
| 4,373,308 A | | 2/1983 | Whittaker |
| 4,483,320 A | | 11/1984 | Wetzel, Jr. et al. |
| 4,512,157 A | | 4/1985 | Weadock |
| 4,545,365 A | | 10/1985 | Wetzel, Jr. |
| 4,628,692 A | | 12/1986 | Pierce |
| 5,899,071 A | | 5/1999 | Stone et al. |
| 6,511,298 B2 | * | 1/2003 | Takura et al. ............. 417/350 |
| 2009/0255528 A1 | | 10/2009 | Weise et al. |
| 2009/0266096 A1 | * | 10/2009 | Minds et al. ............. 62/235.1 |
| 2010/0147006 A1 | * | 6/2010 | Taras et al. ............... 62/335 |

FOREIGN PATENT DOCUMENTS

| | | |
|---|---|---|
| DE | 29613801 U1 | 9/1997 |
| EP | 0229373 A1 | 7/1987 |
| JP | 55-049640 | 4/1980 |
| JP | 2009264712 A | 11/2009 |

OTHER PUBLICATIONS

"Solar Refrigeration", by Sanford A. Klein, Ph.D. and Douglas T. Reindl, Ph.D., in Building for the Future, A Supplement to ASHRAE Journal, Sep. 2005, pp. S26-S30.

* cited by examiner

*Primary Examiner* — Cheryl J Tyler
*Assistant Examiner* — Ana Vazquez
(74) *Attorney, Agent, or Firm* — Fulwider Patton LLP

(57) ABSTRACT

A solar powered compressor and pump is disclosed having a trough-shaped parabolic reflector for heating a conduit of refrigerant as it passes through the system. The compressor/pump combination includes a lens that covers the reflector and insulates and protects the reflector from the elements while increasing the intensity of the sun's energy entering the reflector. The reflector converts the sun's energy into heat that superheats the refrigerant as it passes through the reflector, reducing or eliminating the amount of mechanical work that the system has to do to achieve the needed superheating stage.

4 Claims, 3 Drawing Sheets

SOLAR POWERED COMPRESSOR/PUMP COMBINATION

BACKGROUND

It has long been recognized that solar power provides a clean, efficient, inexpensive and renewable energy source that can be used for many different applications. Solar energy is believed to hold the future of the world's energy needs once it can be effectively harnessed. This has led to a tremendous amount of research and investment in solar energy and its conversion to useful energy such as electricity through photoelectric solar cells, thermal energy in the form of solar water and space heaters for heating applications, and energy storage that can be used to power domiciles and commercial buildings. There has been less research, however, into using the sun's energy for cooling applications. The present invention seeks to provide a significant advance over the prior art and serves to convert the sun's heat into a system that can provide, among other things, a cooling system.

Mechanical cooling systems are also well known in the art. In a refrigeration system using a basic vapor compression cycle, cooling is achieved in an evaporator as low temperature refrigerant such as Freon enters the evaporator as a mixture of liquid and vapor and is completely vaporized by a thermal input. The remaining equipment in the system attempts to reclaim the refrigerant and restore it to a condition that can be used again to provide cooling. The vapor exiting the evaporator in a saturated or slightly superheated condition enters a compressor that raises the pressure and, consequently, the temperature of the refrigerant. The high pressure hot refrigerant enters a condenser heat exchanger that uses ambient air or water to cool the refrigerant to its saturation temperature prior to fully condensing to a liquid. The high-pressure liquid is then throttled to a lower pressure, which causes some of the refrigerant to vaporize as its temperature is reduced. The low temperature liquid that remains is available to produce useful refrigeration.

FIG. 1 depicts a typical, single-stage vapor-compression system. Such systems typically have four main components: an evaporator 10, a compressor 20, a condenser 30, and an expansion valve 40 (also called a throttle valve). Circulating refrigerant enters the compressor in the thermodynamic state known as a saturated vapor and is compressed to a higher pressure, resulting in a higher temperature as well. The hot, compressed vapor is then in the thermodynamic state known as a superheated vapor and it is at a temperature and pressure at which it can be condensed with typically available cooling water or cooling air. That hot vapor is routed through a condenser where it is cooled and condensed into a liquid by flowing through a coil or tubes with cool water or cool air flowing across the coil or tubes. This is where the circulating refrigerant rejects heat from the system and the rejected heat is carried away by either the water or the air (whichever may be the case).

The condensed liquid refrigerant, in the thermodynamic state known as a saturated liquid, is next routed through an expansion valve where it undergoes an abrupt reduction in pressure. That pressure reduction results in the adiabatic flash evaporation of a part of the liquid refrigerant. The auto-refrigeration effect of the adiabatic flash evaporation lowers the temperature of the liquid and vapor refrigerant mixture to where it is colder than the temperature of the enclosed space to be refrigerated.

The cold mixture is then routed through the coil or tubes in the evaporator. A fan may be used to circulate the warm air in the enclosed space across the coil or tubes carrying the cold refrigerant liquid and vapor mixture. That warm air evaporates the liquid part of the cold refrigerant mixture. At the same time, the circulating air is cooled and thus lowers the temperature of the enclosed space to the desired temperature. The evaporator is where the circulating refrigerant absorbs and removes heat which is subsequently rejected in the condenser and transferred elsewhere by the water or air used in the condenser. To complete the refrigeration cycle, the refrigerant vapor from the evaporator is again a saturated vapor and is routed back into the compressor.

The major energy input to a vapor compression refrigeration system is the mechanical power needed to drive the compressor. The minimum compressor power is given in Equation 1. The compressor power requirement is substantial because the specific volume of the refrigerant vapor, v, is large. Additional power is needed to operate the fans or pumps to move the external fluids.

$$\dot{W}_{comp,min} = \dot{m} \int_{P_1}^{P_2} v \, dP \qquad (1)$$

The important consideration for a vapor compression refrigeration system is its coefficient of performance (COP), defined as the ratio of the cooling capacity to the total electrical power required. A COP for a system providing refrigeration at −10° C. (14° F.) while rejecting heat to a temperature at 30° C. (86° F.) is approximately 3. The system COP diminishes from that level when the electrical power required for moving the external fluids is accounted for in the coefficient of performance. If the energy requirements could be accomplished by solar energy, or at least a major portion of the energy requirements satisfied by solar power, the COP would increase dramatically and greatly improve the efficiency and cost of the system. The present invention is directly to improving the efficiency of existing cooling systems with a solar powered compressor that can be substituted for or used along with an existing compressor in a cooling system to increase the cooling and reduce costs.

SUMMARY OF THE INVENTION

The present invention is directed to a solar power compressor and pump that can, for example, be retrofitted to an existing cooling system to energize a refrigerant through use of the sun's energy as part of or in lieu of a traditional mechanical compressor system. A solar reflector heats a conduit passing through the reflector using the sun's energy as the refrigerant exits the evaporator or heat exchanger, reducing or eliminating the energy requirements of the existing mechanical compressor. In many cases the solar compressor can completely achieve the objectives of the mechanical compressor, eliminating the main power drain on the system. To boost the energy efficiency of the invention, an optional co-generation heat exchanger or an EMS system can significantly enhance the COP of the system.

DETAILED DESCRIPTION OF THE PREFERRED EMBODIMENTS

Figure 1:
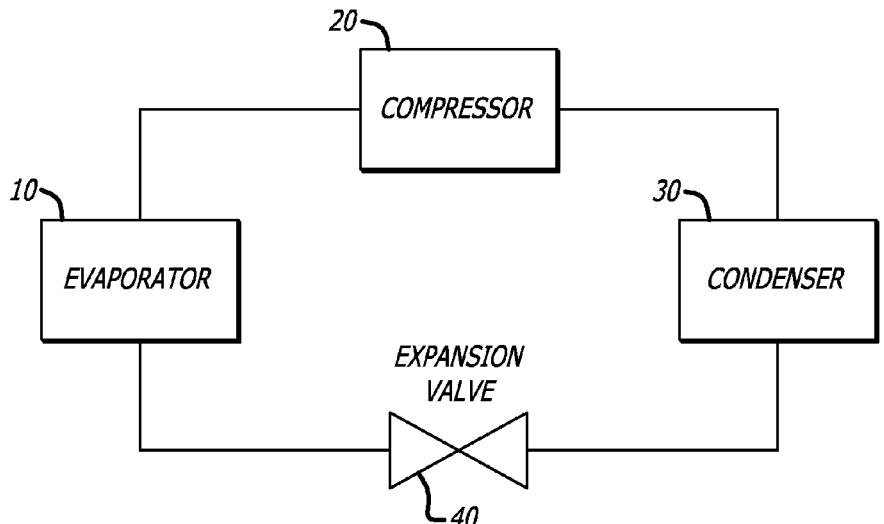
FIG. 1 is a schematic of a prior art refrigeration cycle.
Figure 2:
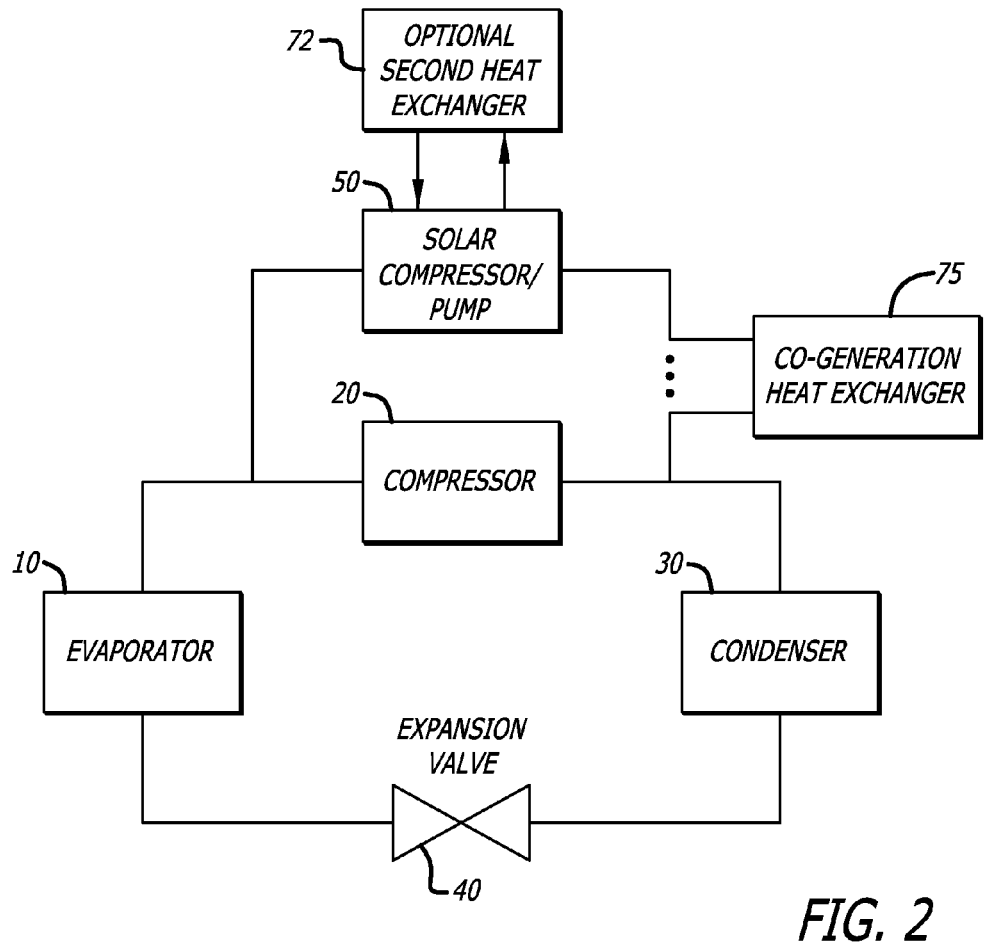
FIG. 2 is a schematic of the refrigeration cycle of FIG. 1 with a solar compressor and pump of the present invention added.

The present invention is directed to a solar powered refrigeration system using a refrigerant-type vapor compression cycle. The heat power cycle may be, for example, a Rankine cycle in which a fluid is vaporized at an elevated pressure by heat exchange with a fluid heated by solar collectors. FIG. 2 illustrates the basics of a refrigeration system previously discussed, but includes the solar powered compressor 50 of the present invention in parallel or circumventing the existing main compressor 20. In some cases, the solar powered compressor replaces the mechanical compressor 20, and in other cases it assists as a secondary source. One of the benefits of the present invention is that it can easily be retrofitted into existing cooling systems with dramatically improved efficiencies and lower costs to operate without redesigning the old system or constructing a new system. The present invention also contemplates that an optional co-generation heat exchanger 75 is incorporated after the solar compressor 50 to recover and utilize excess heat of the refrigerant as it exits the solar compressor. That is, in some cases the refrigerant is heated beyond the needs of the system and the excess heat can be used for many purposes, such as heater water for domestic or commercial use, heating a pool or spa, steam generation for generating electricity, and the like. Various co-generation heat exchangers are well known in the art, and their descriptions are omitted herein for brevity.

The solar compressor 50 can also be coupled to a second heat exchanger 72 using a different refrigerant to that used in the primary cycle. If the second refrigerant is chosen to boil at a lower temperature than the first refrigerant in the primary cycle, even more heat can be acquired from the system and used to increase the output or efficiency of the system.

Figure 3:
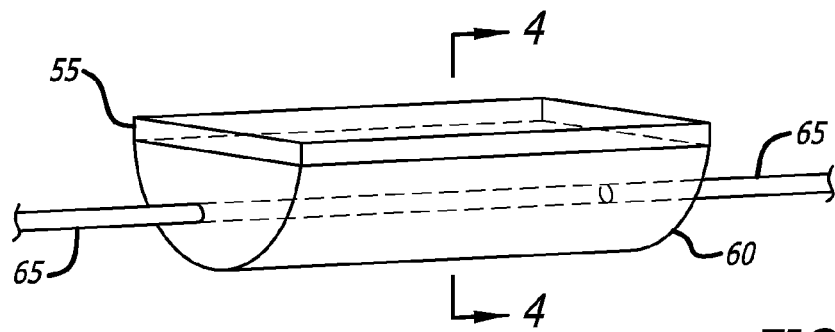
FIG. 3 is an elevated, perspective view of a solar compressor of the present invention.
Figure 4:
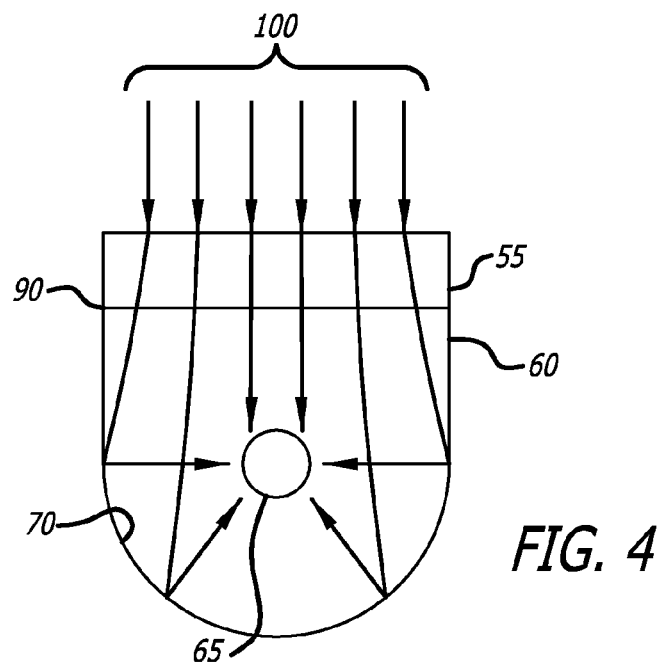
FIG. 4 is a cross section of the reflector of FIG. 3 taken along lines 4-4.

The present invention preferably uses a parabolic trough-shaped reflector 60 to heat a centrally positioned pipe 65 carrying the refrigerant such as that shown in FIGS. 3 and 4. The reflector 60 mounts pipe 65 carrying refrigerant from the evaporator 10 that is in a saturated vapor state and the conduit passes through a focal point of the reflector. As seen in FIG. 4, the sun's rays 100 enter the reflector in a parallel manner and the curvature of the reflector 60 reflect the rays at the pipe 65. As the refrigerant passes through the reflector, the energy transferred to the conduit 65 increases the temperature of the pipe, which may be covered with an energy absorbing material to further increase the transfer of heat, and thereby increase the temperature of the refrigerant passing through. As the temperature of the refrigerant increases, the pressure also increases until the vapor is superheated. This is the condition that it would exit the mechanical compressor, i.e. a superheated state, but no mechanical energy has been used to convert the refrigerant to this condition. Thus, the mechanical compressor can be bypassed or is required to do little or no work before the refrigerant is directed to the condenser 30 as part of the refrigerant cycle. Where the vapor is superheated beyond the requirements of the system, the cogeneration heat exchanger 75 siphons some of the excess heat and utilizes that heat for purposes such as those discussed above.

Figure 5:
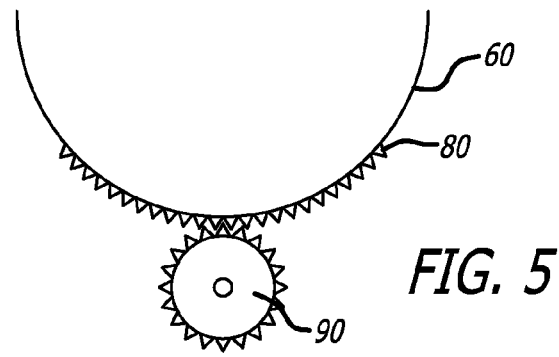
FIG. 5 is a gear system that can be used to tilt the reflector into the most optimal position according to the position of the sun.

The curvature of the reflector 60 may be true parabolic, semi-circular, or some variation that concentrates the sun's rays on the piping 65. The pipe 65 is preferably a copper tubing to be coated with a dark, energy absorbing material that will increase the heat transferred to the refrigerant. The pipe 65 is aligned along the focal point where the sun's rays intersect (see FIG. 4), thereby efficiently directing the most heat to the piping and thus the refrigerant. Temperatures can easily reach several hundred degrees Fahrenheit, thereby superheating the refrigerant. The reflector's interior surface 70 can also be coated with a highly reflective material to further enhance the capacity of the reflector to heat the piping 65. The coating can be metallic or other highly reflective substance. To further enhance the sun's rays 100, a magnifying lens 55 in the form of a reflector cover can be placed over the upper surface of the reflector, where the lens passes the sun's rays through while increasing the intensity of the sunlight heating the piping 65. The lens 55 will be transparent and can further serve to insulate the reflector to prevent heat loss through the upper portion of the reflector and keep impurities, moisture, dirt, debris, insects, mold, and other contaminants out of the reflector. The lens 55 can be hinged 90 to the reflector 60 along a longitudinal side so that it can be pivoted up to access the reflector's interior cavity, or it can slide along a track on the top of the reflector The reflector is preferably connected to a drive system such as that shown in FIG. 5 wherein gears 80 on the bottom of the reflector 60 cooperate with a toothed wheel 90 driven by a motor (not shown). The motor is controlled by software that tracks the sun's position and tilts the reflector in the direction of the moving sun to optimize the effectiveness of the sun's rays, i.e., to make them as normal as possible to the lens 55 at the upper surface of the reflector 60. Such solar tracking systems are available commercially, such as by Suntrack systems of Spain or Array Technologies Inc. of Stanford, N. Mex. The motor drives the wheel 90 in a forward or reverse direction, and the teeth on the wheel 90 cooperate with the gears 80 on the reflector to tilt the reflector directly at the sun as the sun moves across the sky. In another preferred embodiment, the reflector can be tilted longitudinally up or down as well to track the sun at different positions during the year as the sun's path changes from winter to summer. The drive system(s) can be GPS based, taking advantage of the known position of the sun for a particular time and longitude, or use the sun's rays in a feedback loop to determine the optimum angle to tilt the reflector. It may also be preferable that the tracking system be internet accessible so that the reflector can be controlled remotely.

Figure 6:
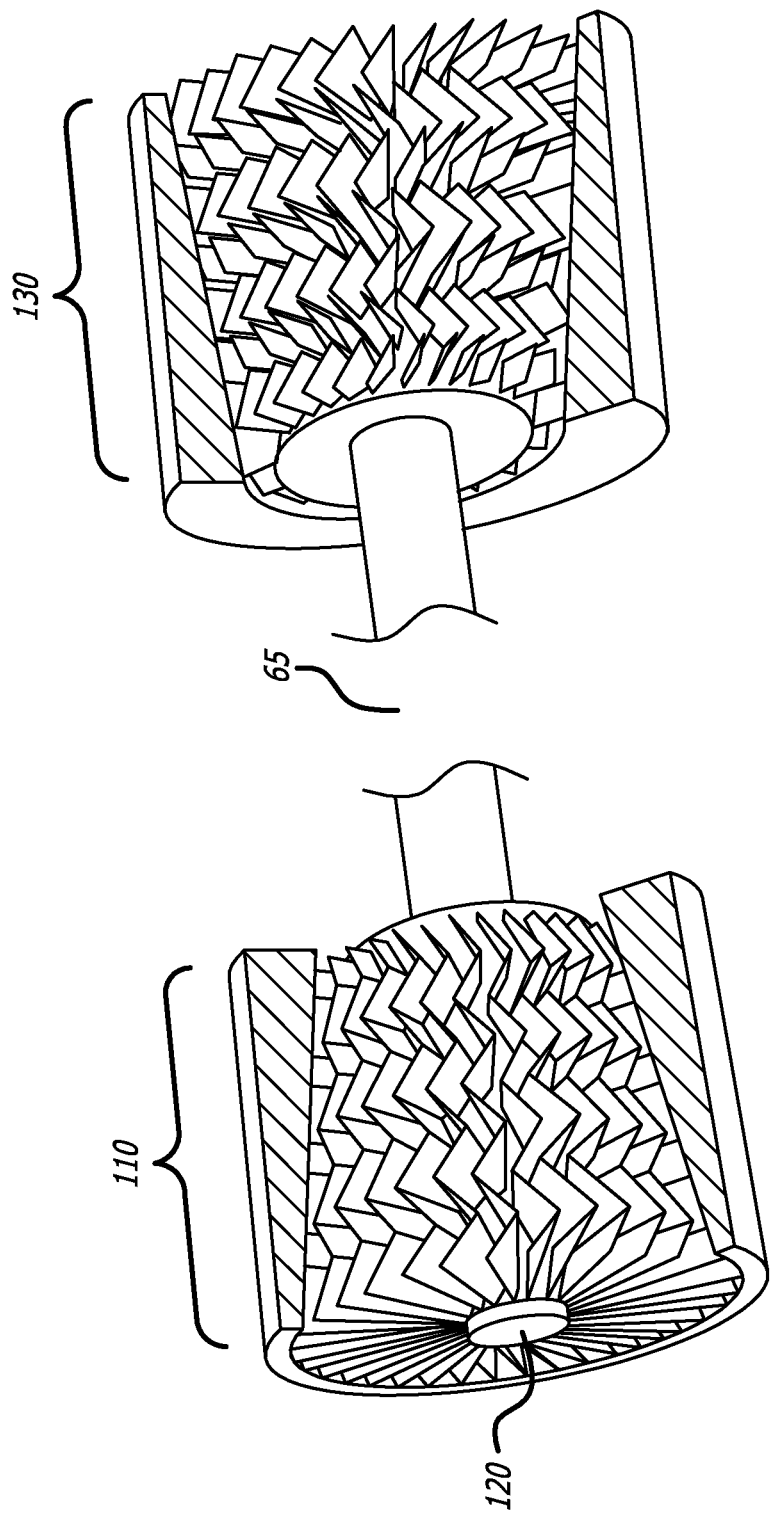
FIG. 6 is an alternate embodiment of the reflector with an axial pump incorporated at each end.

FIG. 6 illustrates an embodiment of the compressor with an axial pump. The refrigerant coming from the evaporator 10 enters a set of blades 110 at the entrance 120 of the reflector before entering the solar heat collector portion 60 shown in FIG. 3. A booster motor (not shown) can be placed at the entrance of the axial pump if needed to suction the refrigerant exiting the evaporator 10. The arrays of blades are set in rows, typically in pairs: one rotating and one stationary. The rotating blades accelerate the vaporized refrigerant, while the stationary blades decelerate and redirect the flow direction, preparing it for the rotor blades of the next stage. A similar set of blades 130 may be located at the exit of the reflector 60. The first set of blades act like a jet to push the refrigerant through the system and the second set of blades acts like a turbocharger to increase the pressure of the refrigerant after it has been superheated by the solar collector, each rotating on an electromagnetic shaft. This further increases the effectiveness of the system.

The system can be roof mounted or pole mounted for safety and better line of sight with the sun, such as a sextant-type mounting system. The overall size of the reflector will generally depend on a number of factors including the heat load and the desired end results. For example, if excess energy is desired beyond the local needs of the system, a larger system can be built and the excess energy can be routed through the power grid to obtain credits or revenue where applicable. There are a number of applications that the present invention is suited for, including steam powered electric generation, hydrogen conversion, remote water recovery, domestic or commercial heating and cooling, water heating, It will become apparent to those of ordinary skill in the art that the invention discussed here will have many applications and can be implemented in a number of ways. Systems to control the direction of the reflector, uses for the energy obtained from the system, and methods for storing the excess heat, are considered to be part of the invention. Thus, the present invention is not to be limited by the descriptions and depictions in the foregoing description of the preferred embodiments, but rather by the words of the appended claims using their ordinary and customary meaning.

I claim:

1. A solar powered refrigeration system comprising: a first subsystem comprising a compressor, an evaporator, a condenser, and an expansion valve, and a first refrigerant cycling through each element of the first subsystem; a second subsystem comprising a solar compressor and a second heat exchanger, and a second refrigerant circulating through the solar compressor and the second heat exchanger, where the second refrigerant is different from the first refrigerant, and wherein the second refrigerant is solar heated by the solar compressor to superheat the second refrigerant, wherein the superheated second refrigerant from the second subsystem transfers energy to the first subsystem at the solar compressor to reduce, but not eliminate, a load on the compressor of the first subsystem, the solar compressor having a parabolic reflector controllably oriented so as to optimally direct sunlight to heat a conduit containing the second refrigerant; wherein the efficiency of the first system is increased by reducing an electrical power requirement of the compressor of the first subsystem by using superheated refrigerant generated by the second subsystem.

2. The solar powered refrigeration system of claim 1, further comprising in the first subsystem a co-generation heat exchanger.

3. The solar powered refrigeration system of claim 1 wherein the second refrigerant has a boiling temperature below a boiling temperature of the first refrigerant.

4. The solar powered refrigeration system of claim 1 further comprising a set of rotating blades at an exit of the parabolic reflector to accelerate vaporized second refrigerant.

* * * * *